United States Patent
Wu et al.

(10) Patent No.: US 11,545,113 B1
(45) Date of Patent: Jan. 3, 2023

(54) DISPLAY CONTROL INTEGRATED CIRCUIT APPLICABLE TO PERFORMING MULTI-DISPLAY PROCESSING IN DISPLAY DEVICE

(71) Applicant: Realtek Semiconductor Corp., HsinChu (TW)

(72) Inventors: Cheng-Hung Wu, HsinChu (TW); Yue Cheng Zhao, Suzhou (CN); Tao Xu, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/866,572

(22) Filed: Jul. 18, 2022

(30) Foreign Application Priority Data

Oct. 14, 2021 (CN) .......................... 202111200286.4

(51) Int. Cl.
*G09G 5/14* (2006.01)
(52) U.S. Cl.
CPC ............ *G09G 5/14* (2013.01); *G09G 2360/04* (2013.01); *G09G 2370/025* (2013.01); *G09G 2370/20* (2013.01)
(58) Field of Classification Search
CPC ........ G09G 5/14; G09G 5/006; G09G 3/2092; G09G 3/2096
See application file for complete search history.

(56) References Cited

U.S. PATENT DOCUMENTS

| | | | | |
|---|---|---|---|---|
| 2008/0084359 | A1* | 4/2008 | Giannuzzi | G09G 5/006 345/1.1 |
| 2012/0066425 | A1* | 3/2012 | Zeng | G06F 13/00 710/303 |
| 2015/0340009 | A1* | 11/2015 | Loeffler | G09G 5/04 345/1.3 |
| 2018/0260184 | A1* | 9/2018 | Hardacker | G09G 5/005 |
| 2020/0302894 | A1* | 9/2020 | Khen | G09G 5/14 |

* cited by examiner

*Primary Examiner* — Kevin M Nguyen
(74) *Attorney, Agent, or Firm* — Winston Hsu (57) ABSTRACT

A display control integrated circuit (IC) applicable to performing multi-display processing in a display device includes multiple sub-circuits such as a Multi-Stream Transport (MST) stream splitting module, multiple video format conversion circuits, a multiplexer and a video combination module for generating a combined picture for being displayed. The display control IC may utilize at least one additional data path coupled to at least one predetermined sub-circuit among the multiple sub-circuits to obtain at least one signal, and output any signal of the at least one signal through a video output terminal of the display control IC and a video output port of the display device to be a video output signal for further use, where the at least one predetermined sub-circuit include at least one of the MST stream splitting module and the multiplexer.

10 Claims, 10 Drawing Sheets

DISPLAY CONTROL INTEGRATED CIRCUIT APPLICABLE TO PERFORMING MULTI-DISPLAY PROCESSING IN DISPLAY DEVICE

BACKGROUND OF THE INVENTION

1. Field of the Invention

The present invention relates to display control, and more particularly to a display control integrated circuit applicable to performing multi-display processing in a display device.

2. Description of the Prior Art

According to the related art, when a user needs to display two pictures at the same time, the user may need two monitors, two or more cables, and/or an additional device. As a result, some problems may occur. For example, the two monitors, the two or more cables, etc. may occupy limited space, which may be inconvenient to the user. In particular, when the picture count of multiple pictures that need to be displayed simultaneously increases to reach a larger number such as three, four, five, six, etc., the respective amounts of monitors, cables, and/or additional devices that the user needs may be correspondingly increase, which may result in the user not having enough space to work. Therefore, there is a need for a novel method and associated architecture to realize a display device with reliable display control without introducing side effects or in a way that is less likely to introduce a side effect.

SUMMARY OF THE INVENTION

An object of the present invention is to provide a display control integrated circuit applicable to performing multi-display processing in a display device, in order to solve the above problems.

Another object of the present invention is to provide a display control integrated circuit applicable to performing multi-display processing in a display device, in order to ensure normal operations of a video source device and the display device.

At least one embodiment of the present invention provides a display control integrated circuit which is applicable to performing multi-display processing in a display device. The display control integrated circuit may comprise: a video input terminal; a Multi-Stream Transport (MST) stream splitting module, coupled to the video input terminal; a first video format conversion circuit, coupled to the MST stream splitting module; a second video format conversion circuit, coupled to the MST stream splitting module; a multiplexer (MUX), coupled to the first video format conversion circuit and the second video format conversion circuit; a video combination module, coupled to the multiplexer; and a video output terminal. For example, the video input terminal can be arranged to receive a video input signal, wherein the display control integrated circuit receives an MST video stream from a video source device through a video input port of the display device and the video input terminal to be the video input signal; the MST stream splitting module can be arranged to split the MST video stream into a plurality of Single Stream Transport (SST) video streams, wherein the plurality of SST streams comprise a first SST stream and a second SST stream; the first video format conversion circuit can be arranged to perform a first video format conversion operation on the first SST video stream according to a predetermined video format to generate a first video signal conforming to the predetermined video format; the second video format conversion circuit can be arranged to perform a second video format conversion operation on the second SST video stream according to the predetermined video format to generate a second video signal conforming to the predetermined video format; the multiplexer (MUX) can be arranged to multiplex at least two video signals conforming to the predetermined video format to generate an intermediate video signal for transmitting respective video information of the at least two video signals in turn, wherein the at least two video signals comprise the first video signal and the second video signal; the video combination module can be arranged to perform a video combination operation according to the intermediate video signal to generate a combined picture, for being displayed by a display output module in the display device; and the video output terminal can be arranged to transmit a video output signal from the display control integrated circuit. In addition, the display control integrated circuit can utilize at least one additional data path coupled to at least one predetermined sub-circuit of the display control integrated circuit to obtain at least one signal, and output any signal of the at least one signal through the video output terminal and a video output port of the display device to be the video output signal for further use, wherein the at least one predetermined sub-circuit comprises at least one of the MST stream splitting module and the multiplexer.

One of the advantages of the present invention is that, through a carefully designed display control mechanism, the display control integrated circuit of the present invention can properly perform the multi-display processing in a situation where a single cable is connected between the video source device and the display device. In addition, the display control integrated circuit of the present invention can operate in any configuration of multiple configurations, to allow the display device and one or more other display devices similar or identical to the display device (e.g., one or more display devices equipped with one or more integrated circuits similar or identical to the display control integrated circuit) to form a flexible multi-display system. In comparison with the related art, the display control integrated circuit of the present invention can realize a display device with flexible display control without introducing side effects or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
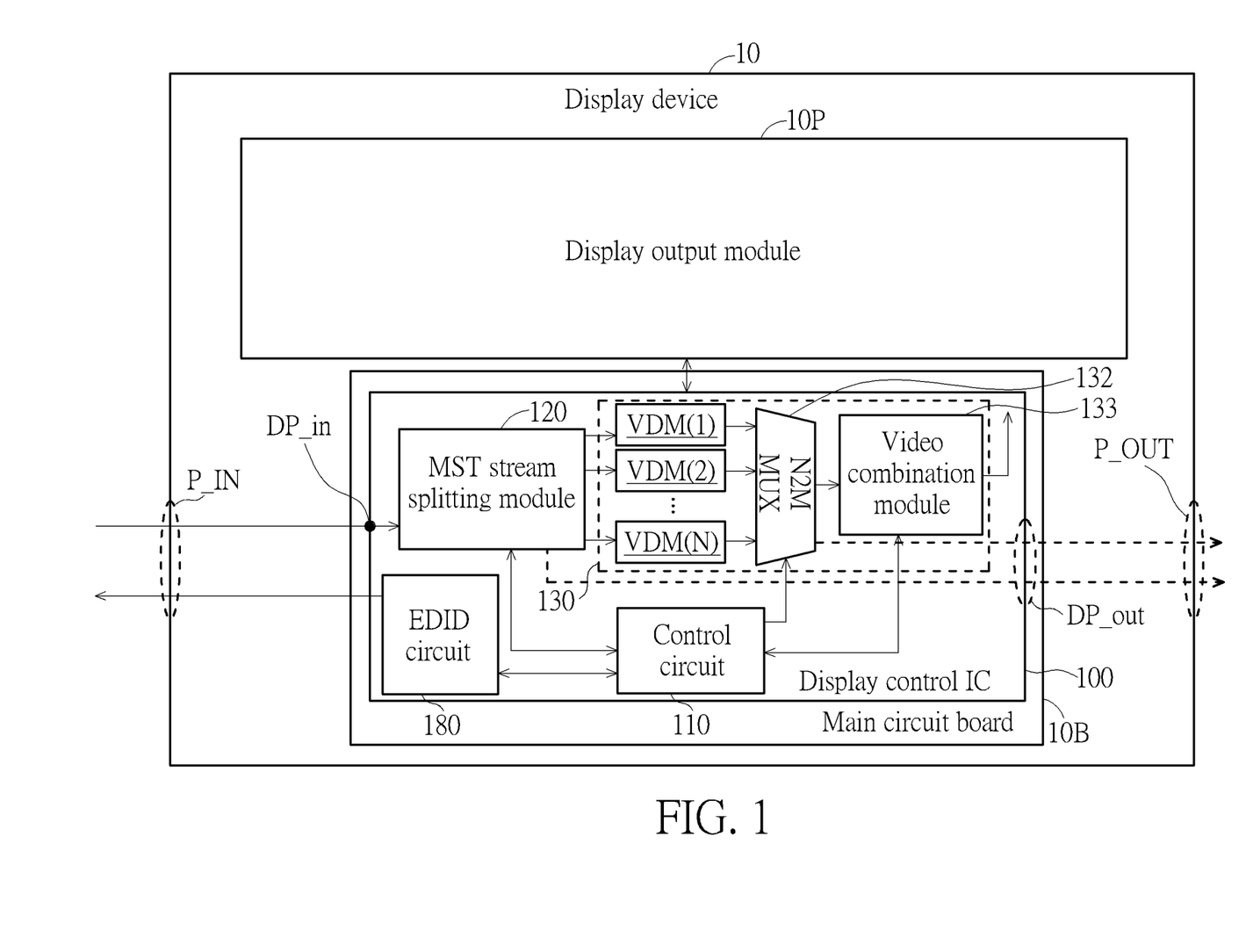
FIG. 1 is a diagram of a display control integrated circuit applicable to performing multi-display processing in a display device according to an embodiment of the present invention.

FIG. 1 is a diagram of a display control integrated circuit (IC) 100 applicable to performing multi-display processing in a display device 10 according to an embodiment of the present invention, wherein the display control IC 100 can be positioned in the display device 10, and more particularly, can be mounted on a main circuit board 10B (e.g., a printed circuit board) of the display device 10, but the invention is not limited thereto. In some embodiments, the main circuit board 10B can be replaced with another circuit board in the display device 10, such as any secondary circuit board of one or more secondary circuit boards. In addition, the display control IC 100 can be implemented as a single chip.

The display device 10 may comprise a display output module 10P (e.g., a display panel such as a Liquid Crystal Display (LCD) panel), the main circuit board 10B together with the display control IC 100 thereon, a video input port P_IN, and a video output port P_OUT, and the display control IC 100 may comprise a plurality of terminals such as a video input terminal DP_in and a video output terminal DP_out, and may comprise a plurality of sub-circuits such as a control circuit 110, a Multi-Stream Transport (MST) stream splitting module 120, a plurality of video format conversion circuits VDM(1), VDM(2), . . . and VDM(N), a multiplexer (MUX) such as an N-to-M MUX (which can be referred to as N2M MUX for brevity) 132, a video combination module 133, and an Extended Display Identification Data (EDID) circuit 180, where the control circuit 110 can control the remaining sub-circuits among the plurality of sub-circuits to control the operations of the display control IC 100, for example, utilizing the MST stream splitting module 120 and the image processing circuit 130 comprising the video format conversion circuits VDM(1), VDM(2), . . . and VDM(N), the N2M MUX 132 and the video combination module 133 to generate a combined picture for being displayed. Since the output format of the video format conversion circuits VDM(1), VDM(2), . . . and VDM(N) is suitable for the processing (e.g., display output control) of the next-stage circuit (e.g., the next stage of circuit) of the image processing circuit 130 for performing video display, the video format conversion circuits VDM(1), VDM(2), . . . and VDM(N) may also be referred to as video display modules.

In the architecture shown in FIG. 1, the main circuit board 10B (e.g., the display control IC 100 therein) can control the operations of the display device 10, and these operations may comprise:
(1) utilizing the display output module 10P to display one or more pictures; and
(2) utilizing a user input device (e.g., one or more buttons) of the display device 10 to receive one or more user inputs of a user of the display device 10, and utilizing the display output module 10P to perform on-screen display (OSD) to guide the user to interact with the display device 10, for example, to guide the user to provide any of the one or more user inputs through the user input device;
but the present invention is not limited thereto. Regarding the display control IC 100, the control circuit 110 may be arranged to control the operations of the display control IC 100, and these operations may comprise:
(1) performing video stream splitting operations, and more particularly, split an MST video stream MST_VS(1, . . . , N) to convert the MST video stream MST_VS(1, . . . , N) into N Single Stream Transport (SST) video streams SST_VS(1)-SST_VS(N), where the symbol "N" may represent a positive integer greater than one;
(2) performing image processing such as the multi-display processing, image brightness adjustment, color temperature adjustment, etc.; and
(3) performing display output control, for example, generating associated display control signals to control the display output module 10P to perform display operations;
but the present invention is not limited thereto. The display control IC 100 can utilize the plurality of terminals thereof to perform signal input or output operations. For example, the video input terminal DP_in can be arranged to receive a video input signal, and the video output terminal DP_out can be arranged to transmit a video output signal from the display control IC 100, where the display control IC 100 can receive the MST video stream MST_VS(1, . . . , N) from a video source device through the video input port P_IN and the video input terminal DP_in to be the video input signal. In addition, the MST stream splitting module 120 can split the MST video streams MST_VS(1, . . . , N) into the SST video streams SST_VS(1)-SST_VS(N). The video format conversion circuits VDM(1)-VDM(N) can perform video format conversion operations on the SST video streams SST_VS(1)-SST_VS(N) according to a predetermined video format to generate N video signals conforming to the predetermined video format, respectively. The N2M MUX 132 can multiplex at least two video signals (e.g., at least two of the N video signals) conforming to the predetermined video format to generate an intermediate video signal for transmitting the respective video information of the at least two video signals to the video combination module 133 in turn, where the at least two video signals may comprise a first video signal and a second video signal respectively output from the video format conversion circuits VDM(1) and VDM(2). The video combination module 133 can perform a video combination operation according to the intermediate video signal to generate the combined picture, for being displayed by the display output module 10P. Additionally, the display control IC 100 can utilize the EDID circuit 180 thereof to generate one or more sets of EDIDs for performing extended display identification such as extended display capability identification. For example, the EDID circuit 180 can be arranged to generate the one or more sets of EDIDs, for performing extended display identification such as extended display capability identification through the video input port P_IN of the display device 10.

Regarding the multi-display processing, the combined picture may comprise a first partial picture and a second partial picture respectively corresponding to the SST video streams SST_VS(1) and SST_VS(2), but the invention is not limited thereto. For example, the combined picture may comprise the first partial picture, the second partial picture and a third partial picture respectively corresponding to the SST video streams SST_VS(1), SST VS(2) and SST VS(3). In some examples, the combined picture may comprise the first partial picture to the $n0^{th}$ partial picture respectively corresponding to the SST video streams SST_VS(1)-SST_VS(n0), where the symbol "n0" may represent any positive integer within the interval [2, N−1] and N may be further restricted to be greater than 2. In another example, the combined picture may comprise the first partial picture to the $N^{th}$ partial picture respectively corresponding to the SST video streams SST_VS(1)-SST_VS(N).

The display control IC 100 may utilize at least one additional data path (e.g., one or more additional data paths) coupled to at least one predetermined sub-circuit among the plurality of sub-circuits to obtain at least one signal, and output any signal of the at least one signal through the video output terminal DP_out and the video output port P_OUT to be the video output signal for further use, where the at least one predetermined sub-circuit may comprise at least one of the MST stream splitting module 120 and the N2M MUX 132, in particular, both of the MST stream splitting module 120 and the N2M MUX 132. As shown in FIG. 1, the at least one additional data path may comprise additional data paths respectively starting from the MST stream splitting module 120 and the N2M MUX 132, such as the data paths depicted with dashed-line arrows. For example, the N video signals can be input into the N video input terminals of the N2M MUX 132, respectively. Under the control of the control circuit 110, the N2M MUX 132 can select the video input signal input into any video input terminal of the N video input terminals thereof to be the video output signal of any video output terminal of the M video output terminals thereof. It is given that the symbol "M" can represent a positive integer greater than one. Assuming that M=2, the N2M MUX 132 can multiplex the N video signals to generate the intermediate video signal and another intermediate video signal at a first video output terminal and a second video output terminal, respectively, and more particularly, transmit the respective video information of the at least two video signals to the video combination module 133 through the intermediate video signal, and transmit the video information of at least one video signal to a certain sub-circuit (positioned on an additional data path starting from the N2M MUX 132) through the other intermediate video signal.

For better comprehension, the multi-display processing may comprise Picture-by-Picture (P×P) processing, but the present invention is not limited thereto. The user of the display device 10 may enable or disable the multi-display processing through the user input device. According to some embodiments, the user may connect the video source device to the video input port P_IN of the display device 10 through a single cable to allow the display device 10 to display multiple pictures simultaneously in a multi-display processing mode such as a P×P mode.

In the above embodiments, examples of the video source device may include, but are not limited to: personal computers such as desktop computers and laptop computers.

According to some embodiments, the display control IC 100 is configurable to utilize the N2M MUX 132 to control the at least two video signals to comprise a third video signal output from the video format conversion circuit VDM(3), but the present invention is not limited thereto. According to some embodiments, the display control IC 100 is configurable to utilize the N2M MUX 132 to control the at least two video signals to not comprise the third video signal.

Figure 2:
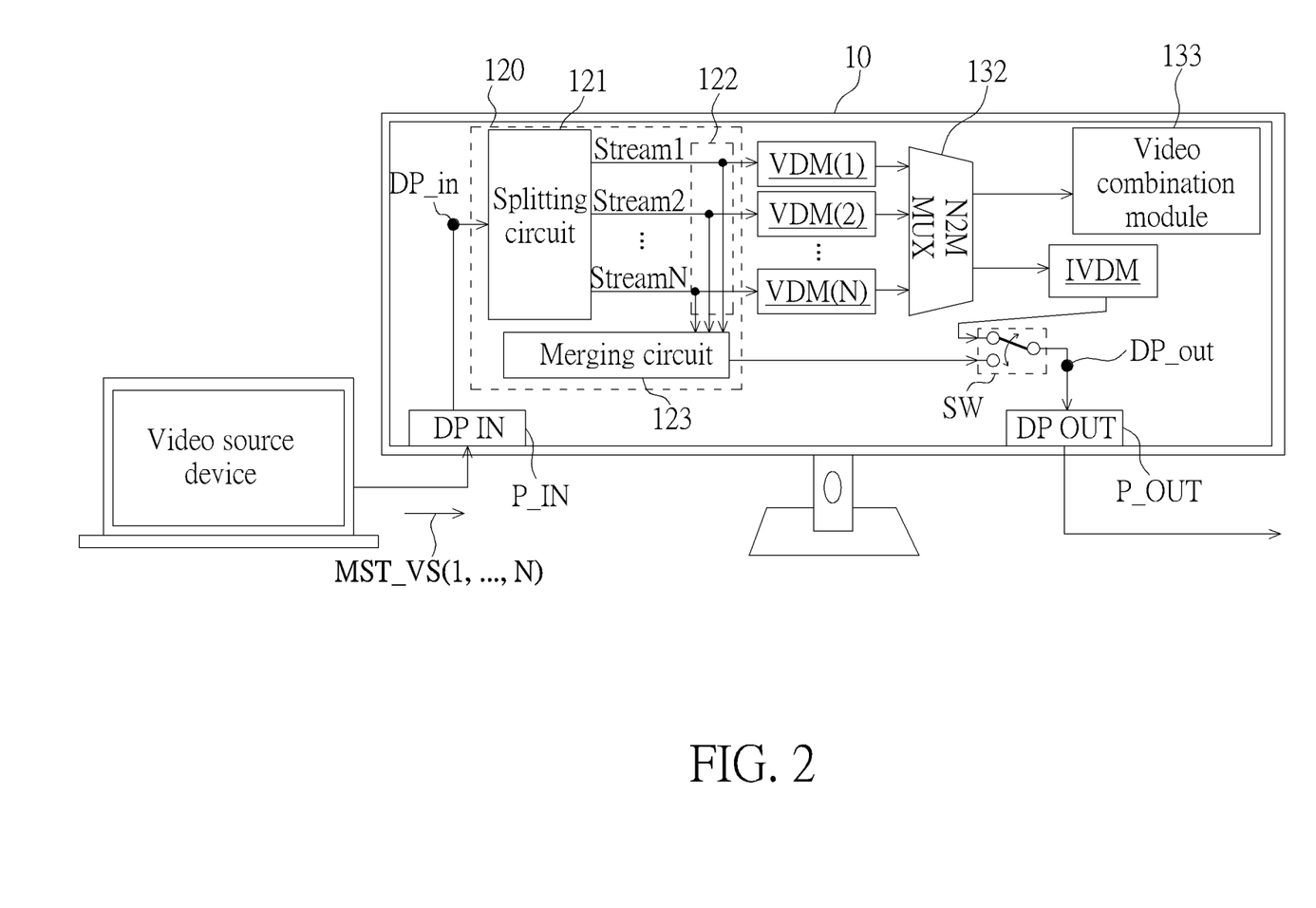
FIG. 2 illustrates an additional data path control scheme of a method for performing multi-display processing in a display device such as the display device shown in FIG. 1 according to an embodiment of the present invention, wherein the method can be applied to the display device shown in FIG. 1 and the display control integrated circuit therein.

FIG. 2 illustrates an additional data path control scheme of a method of performing multi-display processing in a display device such as the display device 10 shown in FIG. 1 according to an embodiment of the present invention, where the method can be applied to the display device 10 shown in FIG. 1 and the display control IC 100 therein. In the display device 10, the video input port P_IN and the video output port P_OUT are respectively labeled "DP IN" and "DP OUT" for brevity. The MST stream splitting module 120 may comprise a splitting circuit 121, a stream switching circuit 122 and a merging circuit 123. The plurality of sub-circuits of the display control IC 100 may further comprise an inverse video format conversion circuit IVDM and a switching circuit SW. Under the control of the control circuit 110, the switching circuit SW can select any of the signals on multiple input terminals thereof as the signal on an output terminal thereof.

As shown in FIG. 2, the splitting circuit 121 can receive the MST video stream MST_VS(1, . . . , N) from the video input terminal DP_in, and split the MST video stream MST_VS(1, . . . , N) into the SST video stream SST_VS (1)-SST_VS(N) such as the streams Stream1-StreamN. The stream switching circuit 122 can selectively switch at least one destination of at least one SST video stream of the SST video streams SST_VS(1)-SST_VS(N) (such as the streams Stream1-StreamN) from at least one video format conversion circuit of the video format conversion circuits VDM(1)-VDM(N) to at least one other circuit such as the merging circuit 123, for generating the any signal of the at least one signal. The merging circuit 123 can selectively bypass or merge the at least one SST video stream to generate the any signal of the at least one signal. If the at least one SST video stream represents only one SST video stream (e.g., the SST video stream SST_VS(N)), the merging circuit 123 bypasses the at least one SST video stream (e.g., the SST video stream SST_VS(N)) as the any signal of the at least one signal; otherwise, in a situation where the at least one SST video stream represents more than one SST video stream, the merging circuit 123 merges the at least one SST video stream (e.g., the SST video streams SST_VS(n0+1)-SST_VS(N)) into another MST video stream (e.g., the MST video stream MST_VS(n0+1, . . . , N)) as the any signal of the at least one signal.

In addition, the inverse video format conversion circuit IVDM can receive the video information of the at least one video signal from the N2M MUX 132 through the other intermediate video signal, and perform inverse video format conversion on the video information of the at least one video signal to obtain a recovered version of at least one SST video stream (this recovered version is substantially equivalent to the at least one SST video stream), for being output to outside the display control IC 100. The display control IC 100 can output the recovered version of any SST video stream among the at least one SST video stream through the video output terminal DP_out and the video output port P_OUT to be the video output signal for further use. For example, the at least one SST video stream and the at least one video signal may represent the SST video stream SST_VS(N) and the $N^{th}$ video signal output from the video format conversion circuit VDM(N), respectively, and more particularly, in a situation where N=3, represent the SST video stream SST_VS(3) and the third video signal, respectively, but the present invention is not limited thereto. For another example, in a situation where the N2M MUX 132 has selected the first video signal to the $(N-1)^{th}$ video signal respectively output from the video format conversion circuits VDM(1)-VDM(N−1) to output the video information of these video signals to the video combination module 133, the N2M MUX 132 can select any video signal among the first video signal to the $N^{th}$ video signal respectively output from the video format conversion circuits VDM(1)-VDM(N) to output the video information of the any video signal to the inverse video format conversion circuit IVDM, to allow the inverse video format conversion circuit IVDM to perform inverse video format conversion on the video information of the any video signal to obtain the recovered version of the corresponding SST video stream, wherein the at least one SST video stream and the at least one video signal may represent the corresponding SST video stream and the any video signal, respectively. For brevity, similar descriptions for this embodiment are not repeated in detail here.

Figure 3:
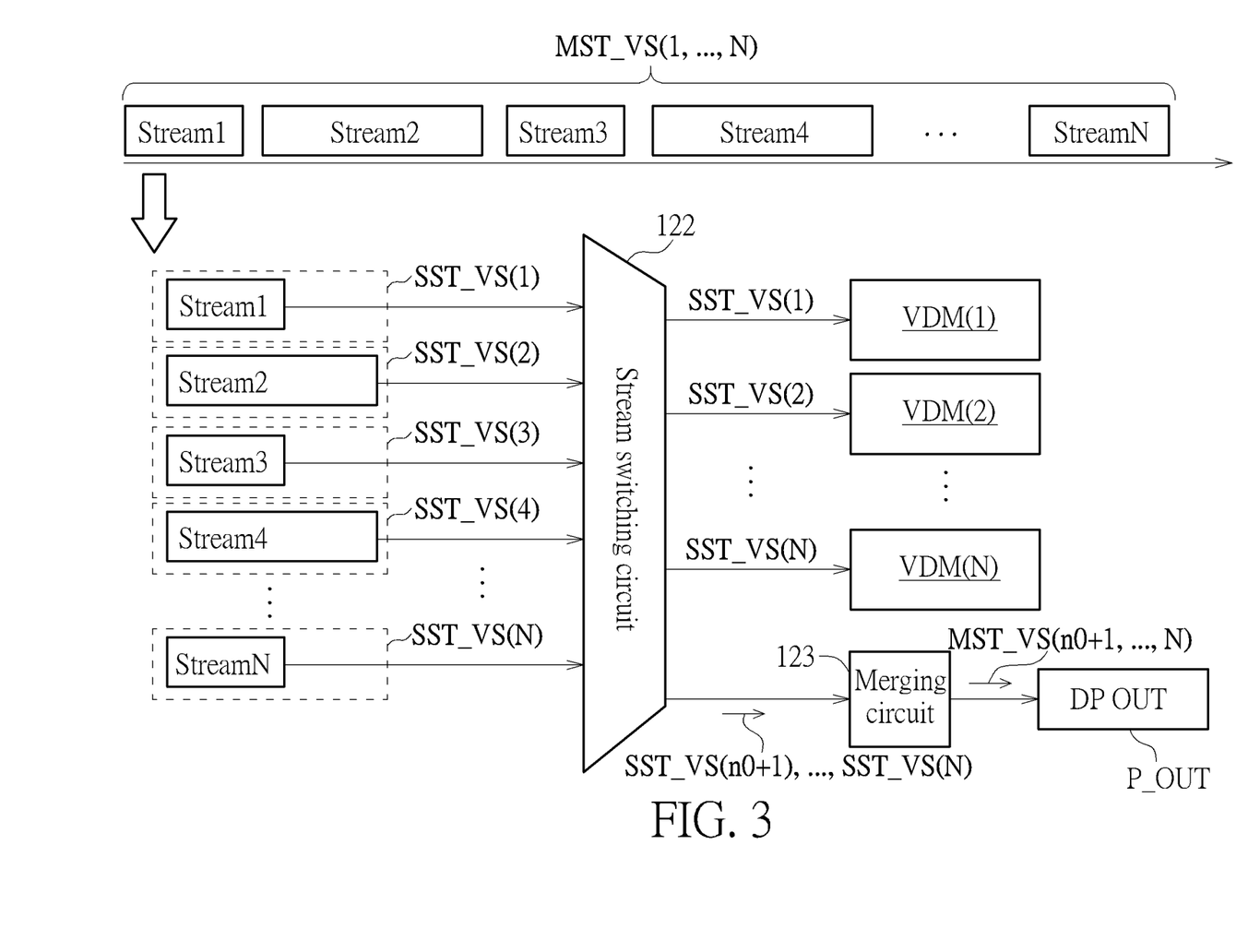
FIG. 3 illustrates a stream splitting and merging control scheme of the method according to an embodiment of the present invention.

FIG. 3 illustrates a stream splitting and merging control scheme of the method according to an embodiment of the present invention. As shown in FIG. 3, the MST video stream MST_VS(1, . . . , N) may comprise the video information of the streams Stream1-StreamN, and the SST video streams SST_VS(1)-SST_VS(N) may comprise the video information of the streams Stream1-StreamN, respectively. The streams Stream1-StreamN may have different lengths, respectively, but the present invention is not limited thereto. Under the control of the control circuit 110, the stream switching circuit 122 can select and transmit the SST video streams SST_VS(1)-SST_VS(N) to the video format conversion circuits VDM(1)-VDM(N) and/or the merging circuit 123. For example, the stream switching circuit 122 can select and transmit the SST video streams SST_VS(1)-SST_VS(N) to the video format conversion circuits VDM(1)-VDM(N). For another example, the stream switching circuit 122 can select and transmit the SST video streams SST_VS(1)-SST_VS(n0) to the video format conversion circuits VDM(1)-VDM(n0), and select and transmit the SST video streams SST_VS(n0+1)-SST_VS(N) to the merging circuit 123, wherein the merging circuit 123 can merge the SST video streams SST_VS(n0+1)-SST VS(N) to generate the MST video stream MST_VS(n0+1, . . . , N). For brevity, similar descriptions for this embodiment are not repeated in detail here.

Figure 4:
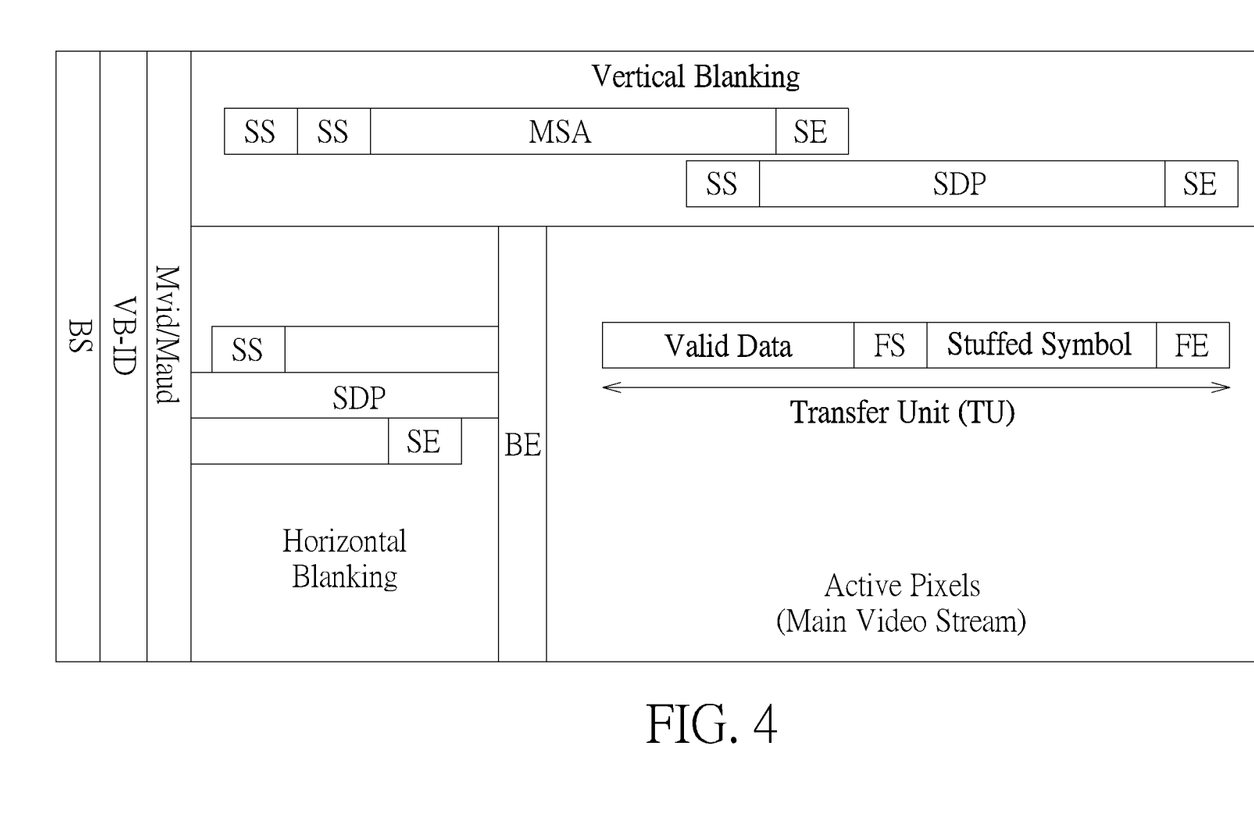
FIG. 4 illustrates an example of a packet format of the Display Port (DP) standard of the Video Electronics Standards Association (VESA).

FIG. 4 illustrates an example of a packet format of the Display Port (DP) standard of the Video Electronics Standards Association (VESA). The MST video streams MST_VS(1, . . . , N), MST_VS(n0+1, . . . , N), etc. and the SST video streams SST_VS(1)-SST_VS(N) involved with the method may conform to the DP standard, and more particularly, conform to the packet format. The fields BS, VB-ID, Mvid/Maud, BE, SS, SE, MSA, SDP, FS and FE as well as the vertical blanking, the horizontal blanking, the active pixels/main video stream, the transfer unit (TU), the valid data, the stuffed symbol, etc. of the packet format are well known to those in the related art, and therefore the details thereof are omitted.

Figure 5:
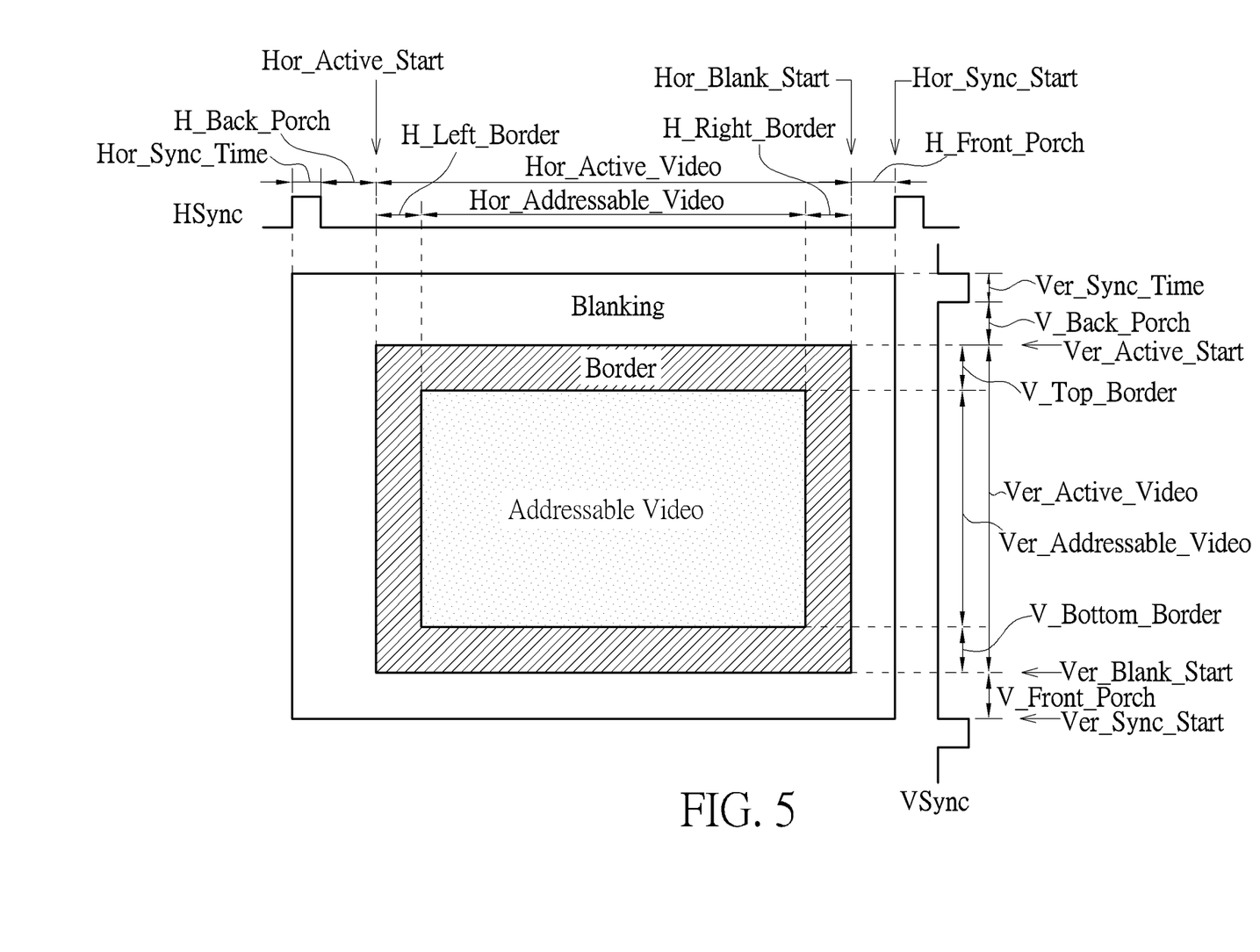
FIG. 5 illustrates an example of a video format of the VESA Display Monitor Timing (DMT) standard.

FIG. 5 illustrates an example of a video format of the VESA Display Monitor Timing (DMT) standard. The predetermined video format involved with the method may represent the video format shown in FIG. 5. The synchronization signals HSync and VSync, the parameters Hor_Active_Start, Hor_Blank_Start, Hor_Sync_Start, Hor_Sync_Time, H_Back_Porch, Hor_Active_Video, H_Front_Porch, H_Left_Border, Hor_Addressable_Video, H_Right_Border, Ver_Active_Start, Ver_Blank_Start, Ver_Sync_Start, Ver_Sync_Time, V_Back_Porch, Ver_Active_Video, V_Front_Porch, V_Top_Border, Ver_Addressable_Video and V_Bottom_Border as well as the blanking, the border, the addressable video, etc. of the video format are well known to those in the related art, and therefore the details thereof are omitted.

According to some embodiments, in the display control IC 100, the MST stream splitting module 120 (e.g., the splitting circuit 121) can split the MST video stream MST_VS(1, . . . , N) into independent streams such as the SST video streams SST_VS(1)-SST_VS(N) according to the DP standard. In addition, the video format conversion circuits VDM(1)-VDM(N) can perform video format conversion (e.g., data parsing and packet conversion) on the SST video streams SST_VS(1)-SST_VS(N) according to the DP standard (e.g., the packet format thereof) and the VESA DMT standard (e.g., the video format thereof) to convert the data of the original DP format packets carried by the SST video streams SST_VS(1)-SST_VS(N) into the data of the VESA timing packets carried by the N video signals, where the data of the DP format packets and the data of the VESA timing packets can be illustrated as shown in FIG. 4 and FIG. 5, respectively. For brevity, similar descriptions for these embodiments are not repeated in detail here.

Figure 6:
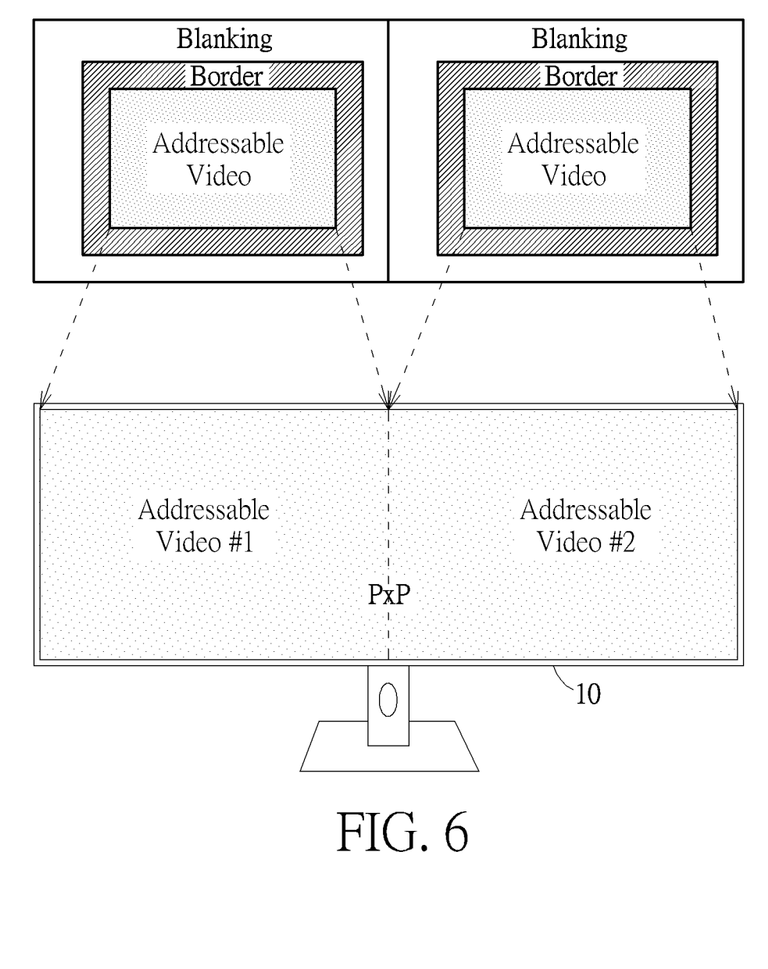
FIG. 6 illustrates a video combination control scheme of the method according to an embodiment of the present invention.

FIG. 6 illustrates a video combination control scheme of the method according to an embodiment of the present invention. Under the control of the control circuit 110, the display control IC 100 can perform the multi-display processing such as the P×P processing (labeled "P×P" for better comprehension) in the display device 10, and more particularly, utilize the video combination module 133 to perform the video combination operation according to the intermediate video signal to generate the combined picture, in order to control the display device 10 to display the combined picture, where the combined picture comprises addressable videos #1 and #2, which can be taken as examples of the first partial picture and the second partial picture, respectively. The video combination module 133 can combine the respective video information of the at least two video signals selected by the N2M MUX 132 (from the N video signals), such as the respective pixel data of the addressable videos #1 and #2, and combine the respective VESA timings of the at least two video signals into the VESA timings of the combined picture, for further processing of the next-stage circuit (e.g., the next stage of circuit) of the image processing circuit 130. As a result, the display control IC 100 can control the display output module 10P to display the combined picture. For brevity, similar descriptions for this embodiment are not repeated in detail here.

According to some embodiments, the combined picture may comprise more addressable videos such as the addressable videos #1, #2, etc., which may be taken as examples of the first partial picture, the second partial picture, etc., respectively. For brevity, similar descriptions for these embodiments are not repeated in detail here.

Figure 7:
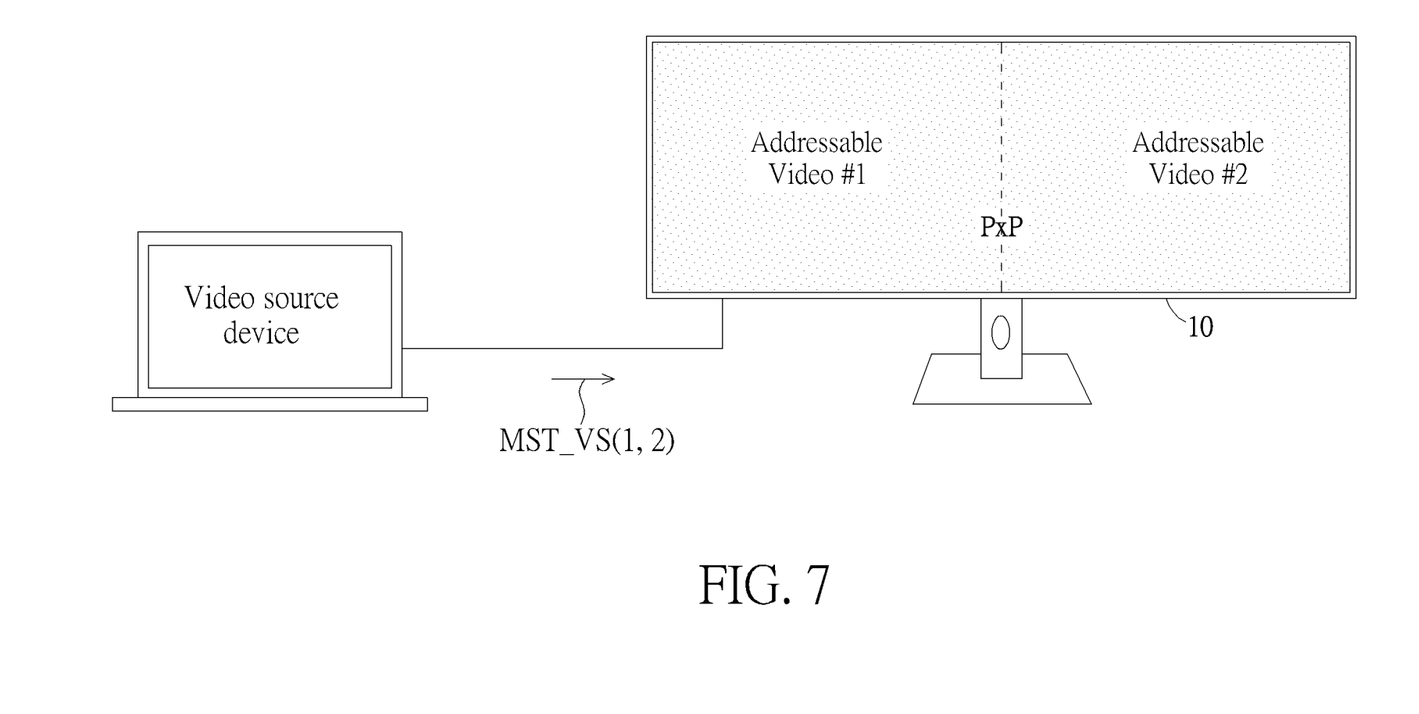
FIG. 7 illustrates a first configuration of the display control integrated circuit shown in FIG. 1 according to an embodiment of the present invention.

FIG. 7 illustrates a first configuration of the display control IC 100 shown in FIG. 1 according to an embodiment of the present invention. When N=2, the MST video stream MST_VS(1, . . . , N) can represent the MST video stream MST_VS(1, 2). The stream switching circuit 122 can select and transmit the SST video streams SST_VS(1)-SST_VS(2) such as the streams Stream1-Stream2 to the video format conversion circuits VDM(1)-VDM(2), and the N2M MUX 132 can multiplex the first video signal and the second video signal to generate the intermediate video signal, for transmitting the respective video information of the first video signal and the second video signal to the video combination module 133 in turn. For brevity, similar descriptions for this embodiment are not repeated in detail here.

According to some embodiments, display control IC 100 can operate in any configuration of multiple configurations, to allow display device 10 and one or more other display devices similar or identical to the display device 10 (e.g., one or more display devices equipped with one or more integrated circuits similar or identical to the display control IC 100) to form a flexible multi-display system.

Figure 8:
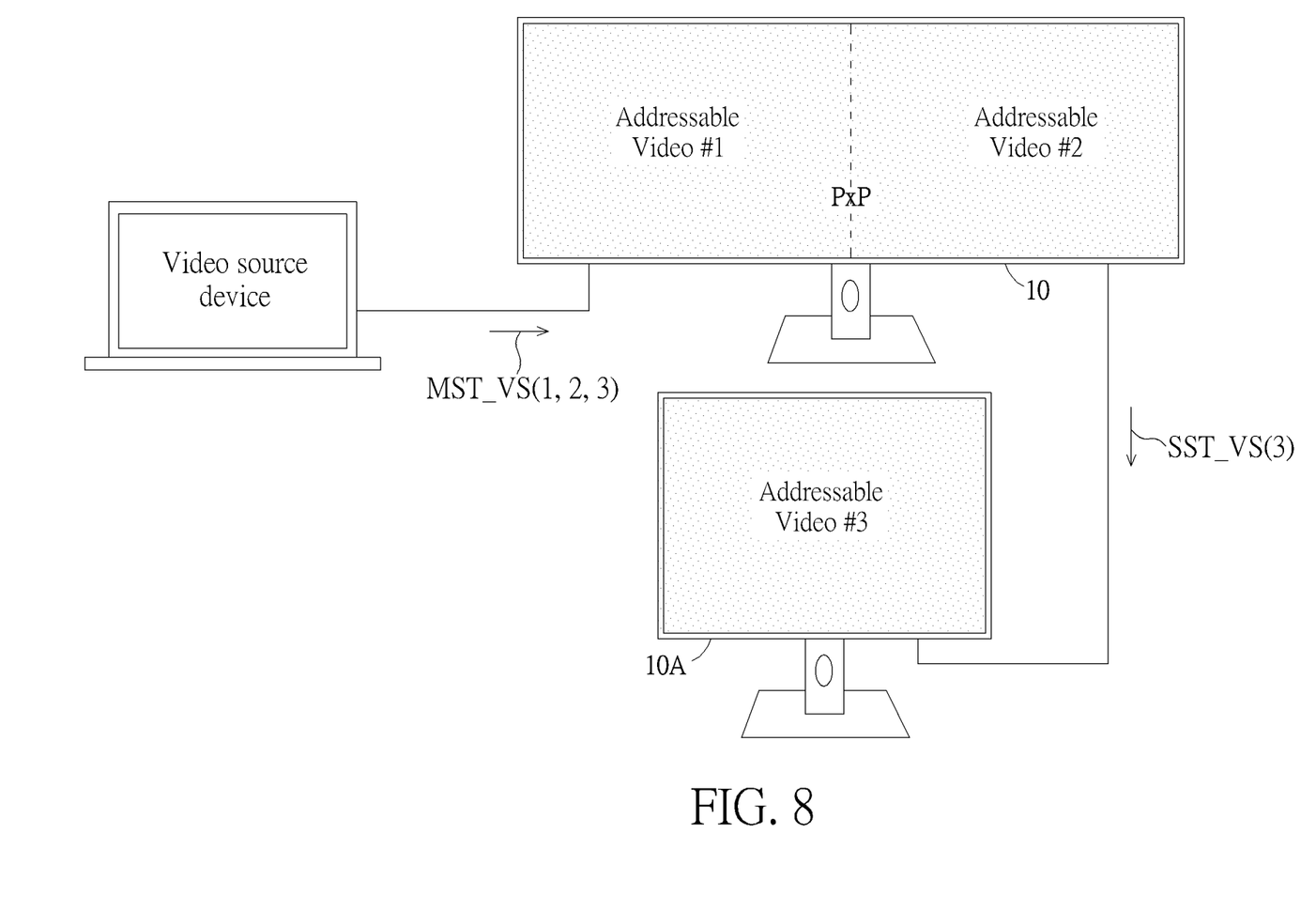
FIG. 8 illustrates a second configuration of the display control integrated circuit shown in FIG. 1 according to an embodiment of the present invention.

FIG. 8 illustrates a second configuration of the display control IC 100 shown in FIG. 1 according to an embodiment of the present invention. The multi-display system may comprise the display device 10 and the one or more other display devices such as the display device 10A, but the present invention is not limited thereto. According to some embodiments, the display device 10A may be replaced with another display device conforming to the DP standard. In addition, when N=3, the MST video stream MST_VS(1, . . . , N) may represent the MST video stream MST_VS(1, 2, 3), and the SST video stream SST_VS(N) may represent the SST video stream SST_VS(3). The display device 10A may receive the SST video stream SST_VS(3) and display the addressable video #3 corresponding to the SST video stream SST_VS(3).

In the display device 10, the stream switching circuit 122 can select and transmit the SST video streams SST_VS(1)-SST_VS(3) such as the streams Stream1-Stream3 to the video format conversion circuits VDM(1)-VDM(3), and the N2M MUX 132 can multiplex the first video signal, the second video signal and the third video signal, to transmit the respective video information of the first video signal and the second video signal to the video combination module 133 through the intermediate video signal, and transmit the video information of the third video signal to the inverse video format conversion circuit IVDM through the other intermediate video signal. The inverse video format conversion circuit IVDM can perform inverse video format conversion on the video information of the third video signal to obtain the recovered version of the SST video stream SST_VS(3), for being output to the outside of the display control IC 100, and more particularly, output to the display device 10A. This recovered version is substantially equivalent to the SST video stream SST_VS(3), and therefore can be labeled "SST_VS(3)" in FIG. 8. For brevity, similar descriptions for this embodiment are not repeated in detail here.

Figure 9:
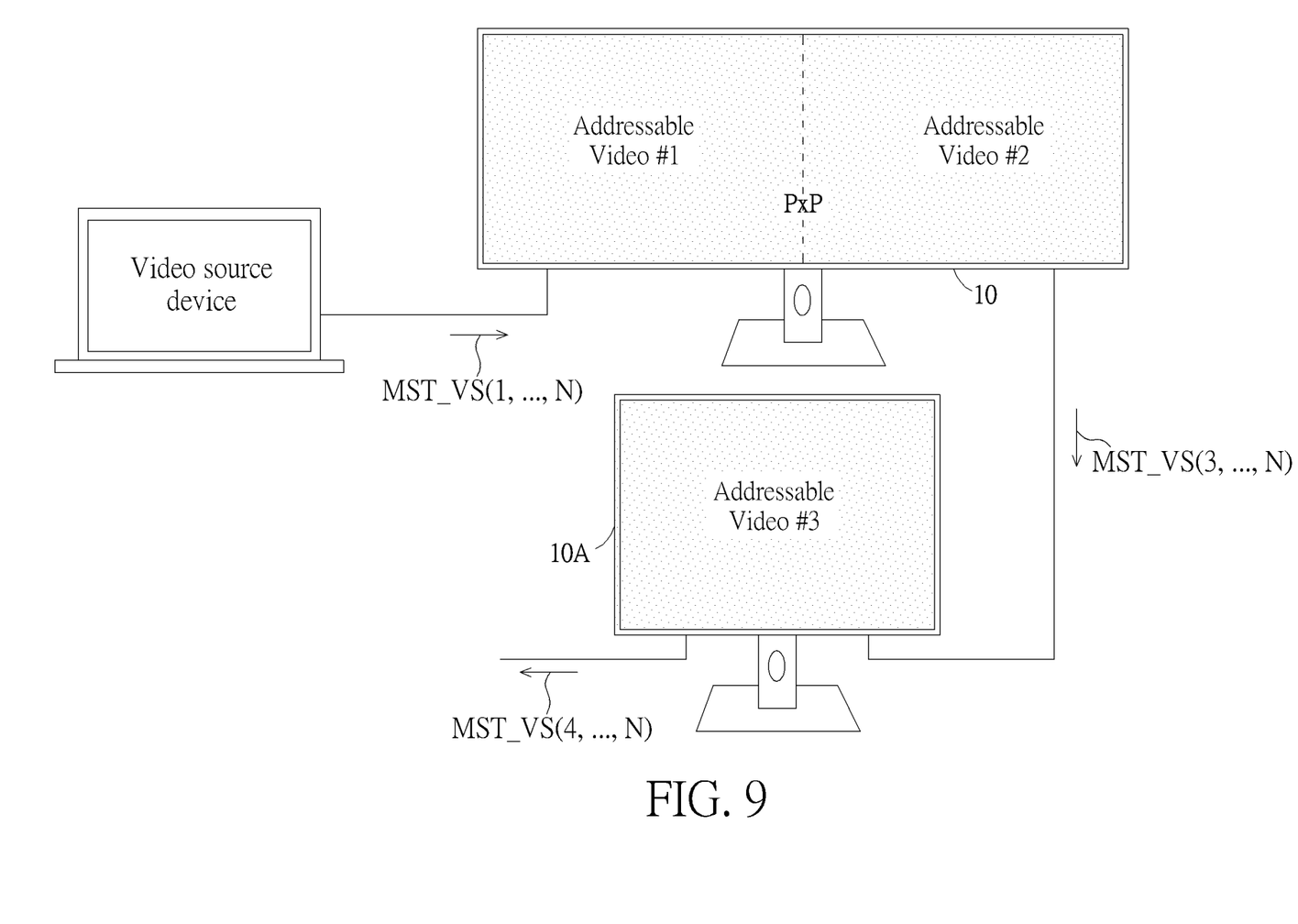
FIG. 9 illustrates a third configuration of the display control integrated circuit shown in FIG. 1 according to an embodiment of the present invention.

FIG. 9 illustrates a third configuration of the display control IC 100 shown in FIG. 1 according to an embodiment of the present invention. The multi-display system may comprise the display device 10 and the one or more other display devices such as the display device 10A, etc. When n0=2, the MST video stream MST_VS(n0+1, . . . , N) may represent the MST video stream MST_VS(3, . . . , N), and the MST video stream MST_VS(n0+2, . . . , N) output by the display device 10A may represent the MST video stream MST_VS(4, . . . , N). The display device 10A may receive the MST video streams MST_VS(3, . . . , N), split the MST video streams MST_VS(3, . . . , N) to obtain (N−2) SST video streams SST_VS(3)-SST_VS(N), display the addressable video #3 corresponding to the SST video stream SST_VS(3), and merge (N−3) SST video streams SST_VS(4)-SST_VS(N) to generate the MST video stream MST_VS(4, . . . , N), for being output to the next-stage display device (e.g., the next stage of display device) in the multi-display system.

In the display device 10, the stream switching circuit 122 can select and transmit the SST video streams SST_VS(1)-SST_VS(2) such as the streams Stream1-Stream2 to the video format conversion circuits VDM(1)-VDM(2), and the N2M MUX 132 can multiplex the first video signal and the second video signal to generate the intermediate video signal, for transmitting the respective video information of the first video signal and the second video signal to the video combination module 133 in turn. In addition, the stream switching circuit 122 can select and transmit the SST video streams SST_VS(3)-SST_VS(N) such as the streams Stream3-StreamN to the merging circuit 123. The merging circuit 123 can merge the SST video streams SST_VS(3)-SST_VS(N) into the MST video streams MST_VS(3, . . . , N), for being output to the outside of the display control IC 100. For brevity, similar descriptions for this embodiment are not repeated in detail here.

Figure 10:
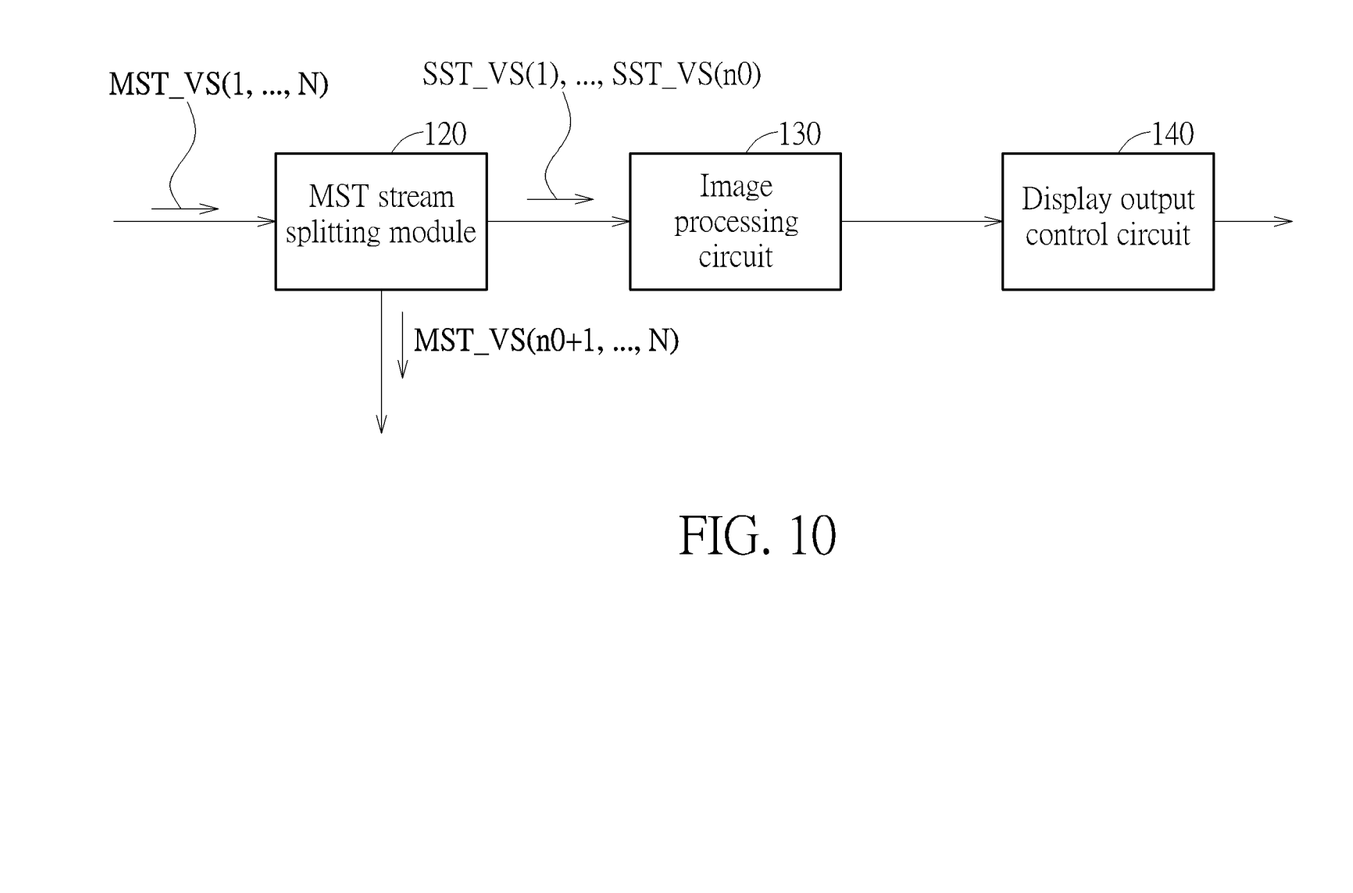
FIG. 10 illustrates some implementation details of the display control integrated circuit shown in FIG. 1 according to an embodiment of the present invention.

FIG. 10 illustrates some implementation details of the display control IC 100 shown in FIG. 1 according to an embodiment of the present invention, where the next-stage circuit (e.g., the next stage of circuit) of the image processing circuit 130 may represent a display output control circuit 140. The display control IC 100 can utilize the plurality of sub-circuits to perform the associated operations, for example:

(1) utilizing the MST stream splitting module 120 to perform video stream splitting to split the MST video stream MST_VS(1, . . . , N) into the SST video streams SST_VS(1)-SST_VS(N), and more particularly, transmit the SST video streams SST_VS(1)-SST_VS(n0) to the image processing circuit 130 for the image processing circuit 130 to perform the image processing such as the multi-display processing (e.g., the multi-picture processing), and merge the SST video streams SST_VS(n0+1)-SST VS(N) into the MST video stream MST_VS(n0+1, . . . , N);

(2) utilizing the image processing circuit 130 to perform the image processing, and more particularly, the multi-display processing (e.g., the multi-picture processing); and (3) utilizing the display output control circuit 140 to perform the display output control. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display control integrated circuit, applicable to performing multi-display processing in a display device, the display control integrated circuit comprising:

a video input terminal, arranged to receive a video input signal, wherein the display control integrated circuit receives a Multi-Stream Transport (MST) video stream from a video source device through a video input port of the display device and the video input terminal to be the video input signal;

a MST stream splitting module, coupled to the video input terminal, arranged to split the MST video stream into a plurality of Single Stream Transport (SST) video streams, wherein the plurality of SST streams comprise a first SST stream and a second SST stream;

a first video format conversion circuit, coupled to the MST stream splitting module, arranged to perform a first video format conversion operation on the first SST video stream according to a predetermined video format to generate a first video signal conforming to the predetermined video format;

a second video format conversion circuit, coupled to the MST stream splitting module, arranged to perform a second video format conversion operation on the second SST video stream according to the predetermined video format to generate a second video signal conforming to the predetermined video format;

a multiplexer (MUX), coupled to the first video format conversion circuit and the second video format conversion circuit, arranged to multiplex at least two video signals conforming to the predetermined video format to generate an intermediate video signal for transmitting respective video information of the at least two video signals in turn, wherein the at least two video signals comprise the first video signal and the second video signal;

a video combination module, coupled to the multiplexer, arranged to perform a video combination operation according to the intermediate video signal to generate a combined picture, for being displayed by a display output module in the display device; and a video output terminal, arranged to transmit a video output signal from the display control integrated circuit;

wherein the display control integrated circuit utilizes at least one additional data path coupled to at least one predetermined sub-circuit of the display control integrated circuit to obtain at least one signal, and outputs any signal of the at least one signal through the video output terminal and a video output port of the display device to be the video output signal for further use, and the at least one predetermined sub-circuit comprises at least one of the MST stream splitting module and the multiplexer.

2. The display control integrated circuit of claim 1, wherein the combined picture comprises a first partial picture and a second partial picture respectively corresponding to the first SST video stream and the second SST video stream.

3. The display control integrated circuit of claim 1, wherein the plurality of SST video streams comprise a third SST video stream; and the display control integrated circuit further comprises:

a third video format conversion circuit, coupled to the MST stream splitting module, arranged to perform a third video format conversion operation on the third SST video stream according to the predetermined video format to generate a third video signal conforming to the predetermined video format, for further use by the display control integrated circuit.

4. The display control integrated circuit of claim 3, further comprising:

an inverse video format conversion circuit, coupled to the multiplexer, arranged to receive video information of the third video signal from the multiplexer, and perform inverse video format conversion on the video information of the third video signal to obtain a recovered version of the third SST video stream for output outside the display control integrated circuit;

wherein the display control integrated circuit outputs the recovered version of the third SST video stream through the video output terminal and the video output port to be the video output signal for further use.

5. The display control integrated circuit of claim 3, wherein the display control integrated circuit is configurable to utilize the multiplexer to control the at least two video signals to not comprise the third video signal.

6. The display control integrated circuit of claim 3, wherein the display control integrated circuit is configurable to utilize the multiplexer to control the at least two video signals to comprise the third video signal.

7. The display control integrated circuit of claim 3, wherein the combined picture comprises a first partial picture, a second partial picture and a third partial picture respectively corresponding to the first SST video stream, the second SST video stream and the third SST video stream.

8. The display control integrated circuit of claim 1, wherein the display control integrated circuit comprises a plurality of video format conversion circuits, and the plurality of video format conversion circuits comprise the first video format conversion circuit and the second video format conversion circuit; and the MST stream splitting module comprises:

a splitting circuit, arranged to receive the MST video stream from the video input terminal, and split the MST video stream into the plurality of SST streams; and a stream switching circuit, coupled between the splitting circuit and the plurality of video format conversion circuits, arranged to selectively switch at least one destination of at least one SST video stream of the plurality of SST video streams from at least one video format conversion circuit of the plurality of video format conversion circuits to at least one other circuit, for generating the any signal of the at least one signal.

9. The display control integrated circuit of claim 8, wherein the MST stream splitting module further comprises:

a merging circuit, coupled to the stream switching circuit, arranged to selectively bypass or merge the at least one SST video stream to generate the any signal of the at least one signal, wherein if the at least one SST video stream represents only one SST video stream, the merging circuit bypasses the at least one SST video stream as the any signal of the at least one signal, otherwise, the merging circuit merges the at least one SST video stream into another MST video stream as the any signal of the at least one signal.

10. The display control integrated circuit of claim 1, wherein the display control integrated circuit is implemented as a single chip.

* * * * *